United States Patent
Li et al.

(10) Patent No.: US 12,003,371 B1
(45) Date of Patent: Jun. 4, 2024

(54) SERVER CONFIGURATION ANOMALY DETECTION

(71) Applicant: SAP SE, Walldorf (DE)

(72) Inventors: Hui Li, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/080,213

(22) Filed: Dec. 13, 2022

(51) Int. Cl.
*G06F 11/14* (2006.01)
*H04L 41/0853* (2022.01)
*H04L 41/0873* (2022.01)
*H04L 41/0894* (2022.01)

(52) U.S. Cl.
CPC ...... *H04L 41/0853* (2013.01); *H04L 41/0873* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 8,037,289 B1 | 10/2011 | Karnik et al. | |
| 9,639,439 B2 | 5/2017 | Laicher et al. | |
| 2012/0226895 A1* | 9/2012 | Anderson | G06F 21/575 713/2 |
| 2013/0191516 A1 | 7/2013 | Sears | |
| 2014/0095286 A1* | 4/2014 | Drewry | G06Q 30/02 705/14.26 |
| 2016/0224406 A1* | 8/2016 | Ilic | G06F 11/0748 |
| 2017/0212829 A1 | 7/2017 | Bales et al. | |
| 2017/0364826 A1 | 12/2017 | Mitarai | |
| 2018/0309822 A1* | 10/2018 | Baradaran | H04L 41/142 |
| 2019/0303158 A1 | 10/2019 | Brar et al. | |

(Continued)

FOREIGN PATENT DOCUMENTS

| | | | |
|---|---|---|---|
| JP | 2015-161954 A2 | 9/2015 | |
| WO | WO-2022038446 A1 * | 2/2022 | ......... H04L 41/0806 |

OTHER PUBLICATIONS

SolarWinds Worldwide, LLC, Server Configuration Monitor, 2022, https://www.solarwinds.com/server-configuration-monitor?CMP=ORG-BLG-DNS-X_WW_X_NP_X_X_EN_0_X-SCM-20201229_DataCenterRemot_X_X_X_X-X, 3 pgs.

(Continued)

*Primary Examiner* — Christopher B Robinson
(74) *Attorney, Agent, or Firm* — Fountainhead Law Group P.C.

(57) ABSTRACT

Mechanisms are disclosed for applying one or more heuristics to collected server configurations to detect anomalous configurations. A collection system requests configuration data, including one or more configuration values, from a plurality of configuration agents running on a plurality of hosted servers. The one or more configuration values are received from the plurality of configuration agents at the collection system. The one or more configuration values are stored in one or more databases, organized based on one or more server identifiers. The one or more configuration values are accessed, by an analysis system, from the one or more databases. One or more heuristics are applied to the one or more configuration values based on the one or more server identifiers. In response to detecting the presence of one or more anomalous server configurations, a notification of one or more server configuration issues is provided.

20 Claims, 5 Drawing Sheets

(56) References Cited

U.S. PATENT DOCUMENTS

| | | | |
|---|---|---|---|
| 2019/0347424 A1 | 11/2019 | Bezzi et al. | |
| 2020/0057858 A1 | 2/2020 | Sharma et al. | |
| 2020/0225944 A1 | 7/2020 | Wright et al. | |
| 2020/0244673 A1* | 7/2020 | Stockdale | H04L 41/14 |
| 2021/0029050 A1* | 1/2021 | Jain | H04L 43/04 |
| 2021/0034965 A1 | 2/2021 | Tan et al. | |
| 2021/0247976 A1 | 8/2021 | Masis et al. | |
| 2021/0263728 A1 | 8/2021 | Farrier | |
| 2021/0286598 A1 | 9/2021 | Luo et al. | |
| 2021/0334096 A1 | 10/2021 | Deluca et al. | |
| 2021/0342143 A1 | 11/2021 | Kabra et al. | |
| 2022/0156154 A1* | 5/2022 | Varnavas | G06F 11/3409 |
| 2022/0206485 A1* | 6/2022 | Qadri | G05B 23/0283 |
| 2022/0215101 A1* | 7/2022 | Rioux | G06F 21/577 |
| 2022/0247659 A1 | 8/2022 | Yousouf et al. | |

OTHER PUBLICATIONS

SolarWinds Worldwide, LLC, Datasheet: Server Configuration Monitor, 2020, 4 pgs.

A. Christi, "Reduce before you localize: Delta-debugging and spectrum-based fault localization", 2018.

Alon, et al. "Code2SEQ: Generating Sequences From Structured Representations of Code", Feb. 21, 2019, 22 pages.

Alon, et al. "Code2vec: Learning Distributed Representations of Code", Oct. 30, 2018, 30 pages.

Allamanis, et al. "A Survey of Machine Learning for Big Code and Naturalness", May 5, 2018, 36 pages.

Chen, et al. "A Literature Study of Embeddings on Source Code", Apr. 5, 2019, 8 pages.

CS Corley, "Recovering traceability links between source code and fixed bugs via patch analysis", 2011.

Ge Dos Santos, Commit Classification using Natural Language Processing: Experiments over Labeled Datasets, 2020.

Mikolov, et al. "Efficient Estimation of Word Representations in Vector Space", Sep. 7, 2013, 12 pages.

S. Gharbi, "On the classification of software change messages using multi-label active learning", 2019.

Yin, et al. "Learning to Represent Edits", Feb. 22, 2019, 22 pages.

* cited by examiner

SERVER CONFIGURATION ANOMALY DETECTION

TECHNICAL FIELD

Embodiments generally relate to detecting server configuration anomalies, and more particularly to applying one or more heuristics to collected server configurations to detect anomalous configurations.

Large data centers may contain thousands of physical hosts and even greater numbers of virtual hosts, which may be grouped into a plurality of groups, with each group potentially having tens or hundreds of hosts. Frequently, it may be desirable that hosts in the same group should use the same or a related configuration for the operating system and/or application software. Operations or development engineers may change the configuration of each group periodically for the upgrade of hardware and/or software. Such tasks may be cumbersome and prone to error. When an erroneous configuration is introduced, all or portions of the data center may not function properly. Often the development engineers may have no permissions or inadequate permissions to remediate system configuration, and in any case, it may not be immediately ascertainable whether a particular configuration value is correct or incorrect as the configuration standard may be frequently changed.

Accordingly, what is needed is a system for applying one or more heuristics to collected server configurations to detect anomalous configurations that overcomes the above-described problems and challenges.

SUMMARY

Disclosed embodiments address the above-mentioned problems by providing one or more non-transitory computer-readable media storing computer-executable instructions that, when executed by a processor, perform a method for applying one or more heuristics to collected server configurations to detect anomalous configurations, the method comprising: requesting, by a collection system, configuration data, including one or more configuration values, from a plurality of configuration agents running on a plurality of hosted servers, receiving, at the collection system, from the plurality of configuration agents the one or more configuration values, storing the one or more configuration values in one or more databases, organized based on one or more server identifiers, accessing, by an analysis system, the one or more configuration values from the one or more databases, applying one or more heuristics to the one or more configuration values based on the one or more server identifiers, and in response to detecting the presence of one or more anomalous server configurations, providing a notification of one or more server configuration issues.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
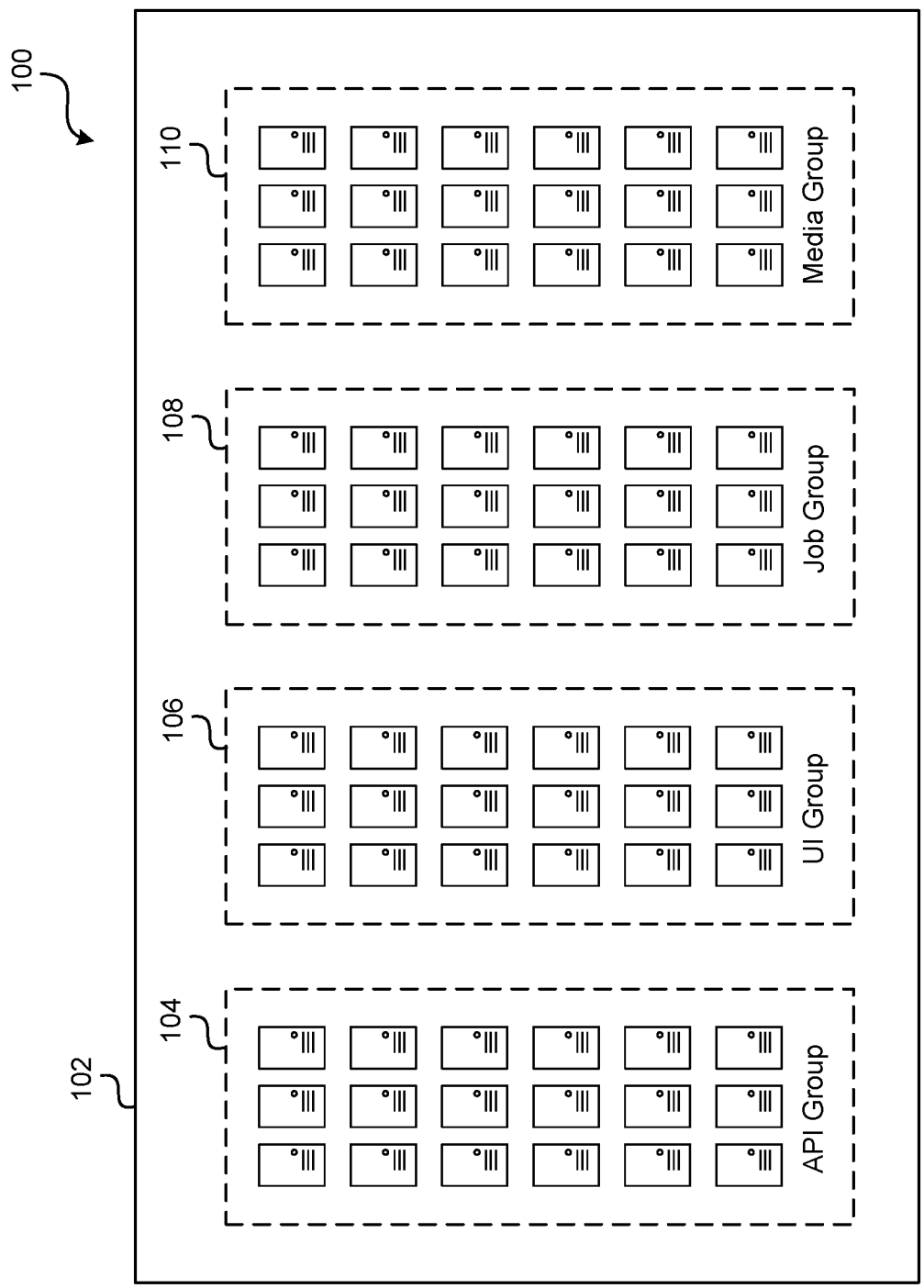
FIG. 1 is a system diagram illustrating a data center containing groups of servers having server configurations that may include anomalous configurations.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Overview

The present teachings describe methods and systems for applying one or more heuristics to collected server configurations to detect anomalous configurations. Such techniques provide an effective method for anomalous configuration detection within a data center for development engineers. In various embodiments, such methods may contain three steps. First, an agent runs in every hosted server, which agent reads and catalogues configurations associated with the hosted server and exposes the catalogued configurations in connection with one or more web services. Next a collection system periodically pulls the associated configurations from the web service of all the hosts and saves them into a database associated with the collection system. Next, an analysis system reads data from the database, analyzes the corresponding configurations, and potentially sends alerts to an engineer who is tasked with maintaining configurations of various hosted servers.

Operational Environment for Embodiments

FIG. 1 is a system diagram 100 illustrating a data center 102 containing groups of servers having server configurations that may include anomalous configurations. For example, as shown in FIG. 1, the data center has four groups, namely: group 104, entitled "API Group," group 106, entitled "UI Group," group 108, entitled "Job Group," and group 110, entitled "Media Group." In some embodiments, the groups assigned to particular sets of servers may relate to the various roles that the associated servers fill. For example, group 104 may provide application programming interface (API) services, such as web service APIs or web hooks. Group 106 may provide user interface services in connection with a hosted application. In some such embodiments, servers in group 106 may provide front-end user interface services to present information to one or more users and receive user interaction based on the presented information. Group 108 may provide services in connection with executing certain processes such as batch processing of information or otherwise providing data processing services. Group 110 may provide media services such as streaming audio and/or video. Systems consistent with the present teachings may collect configuration information from servers in data center 102 aggregate the collected information in a database and provide the collected information to one or more analysis systems in order to provide a source of configuration information to be used in connection with various heuristics to detect anomalous server configurations.

Figure 2:
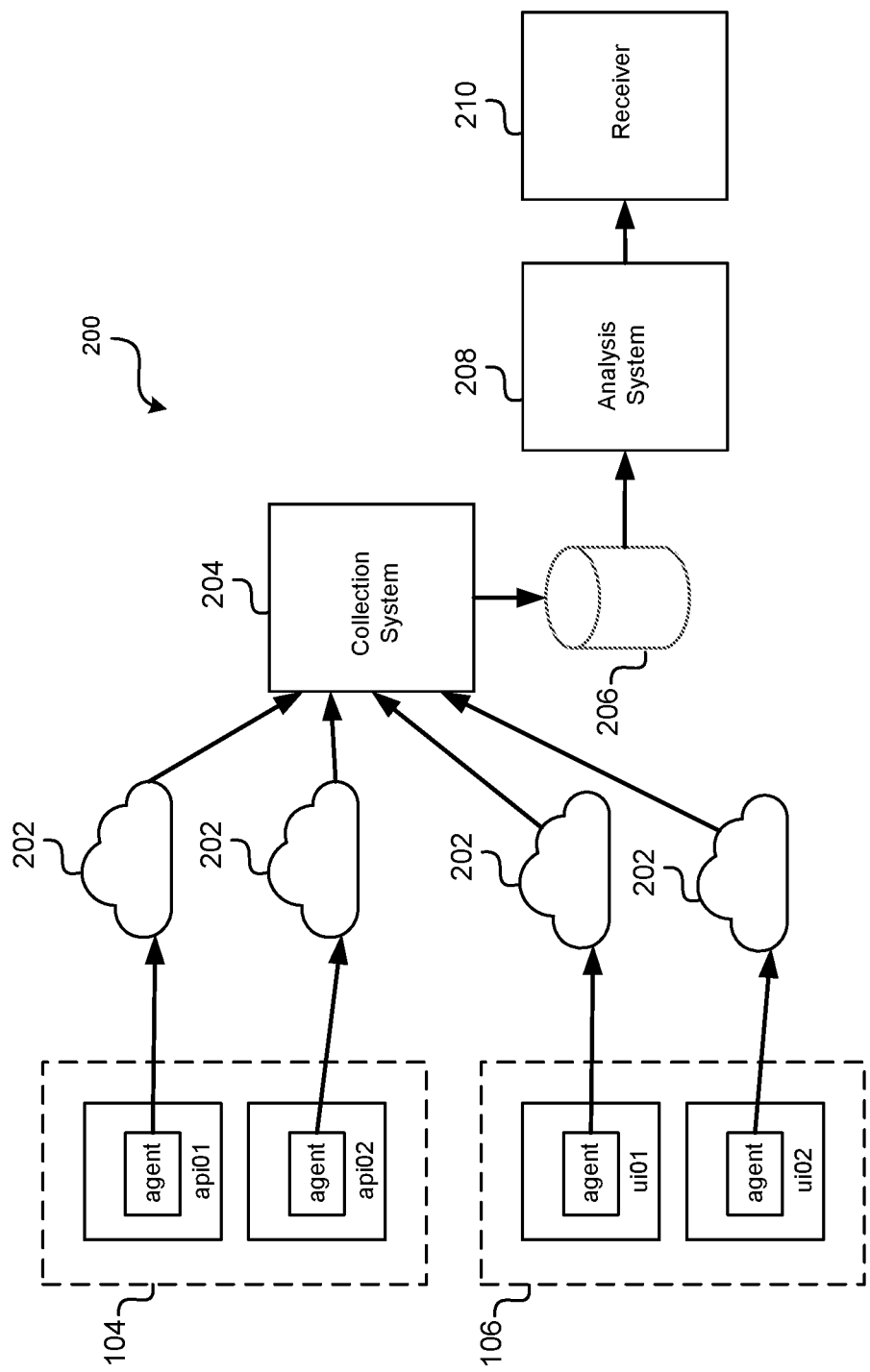
FIG. 2 is a diagram illustrating an example system for applying one or more heuristics to collected server configurations to detect anomalous server configurations.

FIG. 2 is a diagram illustrating an example system 200 for applying one or more heuristics to collected server configurations to detect anomalous server configurations. As described in connection with FIG. 1 above, group 104 may provide application API services, such as web service APIs or web hooks. Group 106 may provide user interface services in connection with a hosted application. In various embodiments, an agent runs in every hosted server, which agent reads and catalogues configurations associated with the hosted server and exposes the catalogued configurations in connection with one or more web services. In some embodiments, such web service interfaces are provided by way of network 202, which may be any kind of a public or private data network. Next collection system 204 periodically pulls associated configurations from the web service of all the hosts and saves them into database 206, which may be associated with collection system 204. Next, analysis system 208 reads data from database 206, analyzes the corresponding configurations, and potentially sends alerts to receiver 210. In some embodiments receiver 210 may be an engineer who is tasked with maintaining configurations of various hosted servers. In some other embodiments, receiver 210 may be an automated system for managing server configurations. In these embodiments the automated system may employ a trained machine learning model to predict whether the notification is related to an actual problem with server configuration, and correct the server configuration, either by installing different versions of software on the server with the anomalous configuration or by bringing up a new server having the correct configuration and switching out the new server for the server with anomalous configuration, by for example, switching server names.

As set forth above, an agent that is running on each server reads the configurations and exposes them in connection with one or more web services. In these embodiments, a single agent may be deployed on each of the hosted servers. Some deployed applications are implemented in the Java programming language. For Java applications, an agent may be implemented as a jar package. In Python or NodeJS applications, the agent may be a script file. The agent may be started automatically along with the operating system and/or application. The agent reads all the predefined configurations and exposes them in connection with a web service. For example, the agent in the host api01 of group 104 (API Group) will expose a web service that provides the following response payload fragment:

{
   "host": "api01",
   "group": "API",
   "ip": "10.1.2.20",
   "updateTime": "2022-03-26T02:34:19",
   "physicalMemory": "50G",
   "timeZone": "ECT",
   "releaseVersion": "b2111.20220309143405",
   "jvmVersion": "SAP_Java_Server_VM_8.1.082 11.0.13+000",
   "jvmXmx": "35831m",
   . . .
}

The field names in the payload fragment have the following meanings. The field name "host" corresponds to the hostname of a particular server. The field "group" corresponds to the group to which the server belongs. The field "ip" corresponds to the IP address of the server. The field "updateTime" corresponds to a timestamp at which the agent accessed the corresponding the configuration. The field "physicalMemory" corresponds to an amount of physical memory allocated to the server's operating system. The field "timeZone" corresponds to the time zone setting corresponding to the time zone in the physical location in which the server is operating. The field "releaseVersion" corresponds to the release version of the application software The field "jvmVersion" corresponds to the Java Virtual Machine (JVM) version of JVM being used to host the application running on the server. The field "jvmXmx" corresponds to the parameter –Xmx of the JVM.

Next, collection system 204 pulls data via web services and saves the corresponding data into database 206. Collection system 204 may maintain a list of all the hosts. In some embodiments, collection system 204 may pull data via one or more web services associated with all the hosts (via an agent associated with the hosts). Collection system 204 may then store them in the database table. In some embodiments, a database table schema may be designed to correspond to a schema that may be the same as or similar to the web service payload provided by the agent. Next, analysis system 208 analyzes the data and provides notifications based on certain heuristics as further explained below in connection with FIG. 3.

Figure 3:
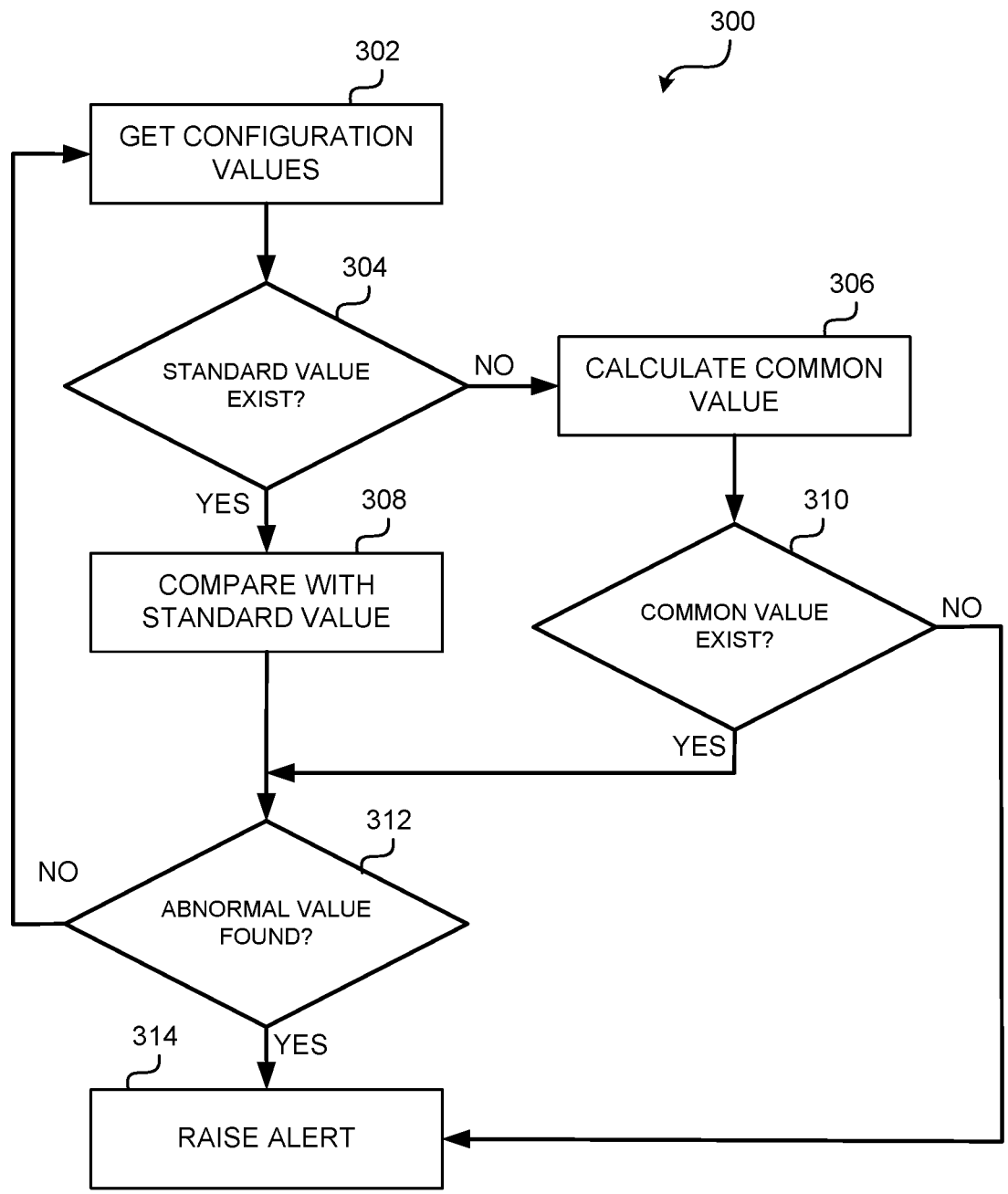
FIG. 3 shows an example process for applying one or more heuristics to collected server configurations to detect anomalous configurations.

FIG. 3 shows an example process 300 for applying one or more heuristics to collected server configurations to detect anomalous configurations. First, at step 302, analysis system, 208 obtains configuration values. In some embodiments, analysis system 208 queries a database associated with collection system 204 as described above in connection with FIG. 2 to obtain the configuration values. At step 304, it is determined whether a standard value exists for one or more configuration parameters accessed in connection with the database query. If it is determined that a standard value does not exist for one or more configuration parameters, analysis system 208 proceeds to step 306. On the other hand, if it is determined that a standard value does exist for one or more configuration parameters, execution proceeds to step 308. At step 308, a configuration parameter associated with each server is compared to the standard value that was determined to exist at test 304 and execution proceeds to test 312.

At step 306, a common value is calculated. Next, at step 310, it is determined whether a common value exists among all of the servers under consideration. If it is determined that a common value exists among all of the servers, execution proceeds to step 312. At step 312, it is determined whether an abnormal value was found. If an abnormal value was not found execution continues back to step 302. If, on the other hand, an abnormal value was found at step 312, execution proceeds to step 314, at which point an alert is raised. In some embodiments, the raising of such an alert may involve providing a notification of an anomalous server configuration.

Figure 4:
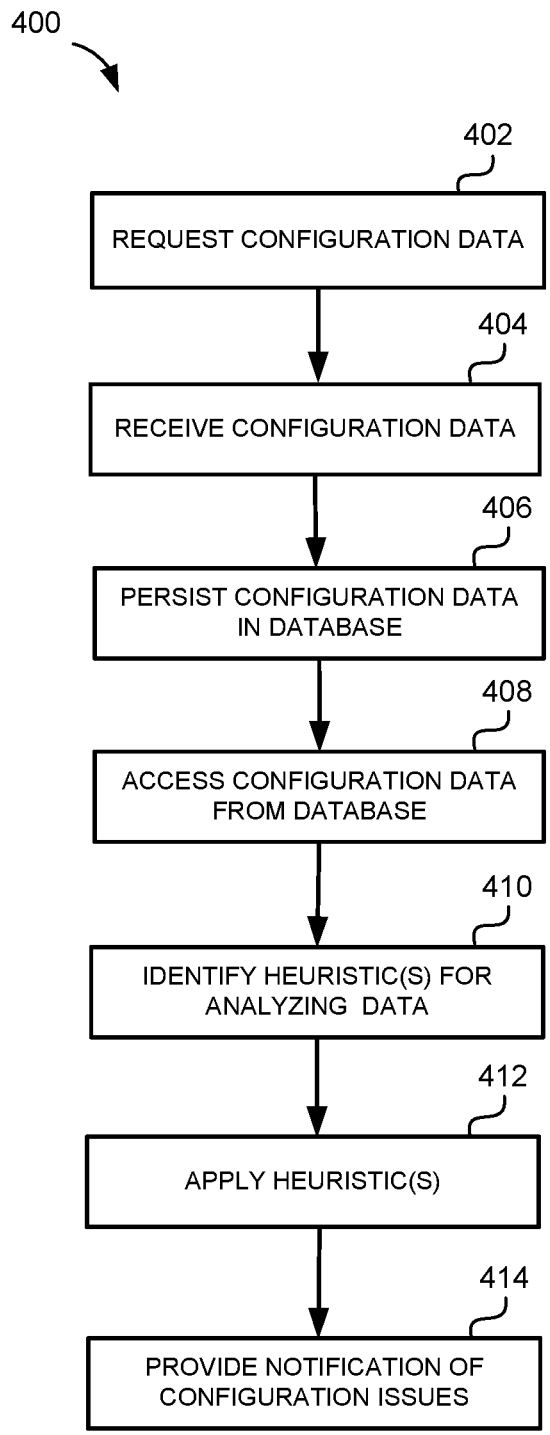
FIG. 4 is a flow diagram illustrating an example method for applying one or more heuristics to collected server configurations to detect anomalous configurations according to certain embodiments.

FIG. 4 is a flow diagram 400 illustrating an example method for applying one or more heuristics to collected server configurations to detect anomalous configurations according to certain embodiments. At step 402, configuration data is requested from a configuration agent, the request including one or more configuration values, from a plurality of configuration agents running on a plurality of hosted servers. At step 404, the one or more configuration values are received at the collection system, from the plurality of configuration agents. At step 406, the one or more configuration values are stored or persisted in one or more databases, organized based on one or more server identifiers. Next, at step 408, the one or more configuration values are accessed, by an analysis system, from the one or more databases.

At step 410, one or more heuristics are identified for analyzing configuration data. In some embodiments, these heuristics may be selected in connection with inference using a trained machine learning model. In these embodiments, the trained machine learning model may be trained on data sets corresponding to past encounters with misconfigured servers having anomalous server configurations. Next, at step 412, the one or more heuristics are applied to the one or more configuration values based on the one or more server identifiers. Finally, in response to detecting the presence of one or more anomalous server configurations, a notification of one or more server configuration issues is provided. In some embodiments, the configuration values comprise operating system configuration values and application configuration values. In some embodiments, the one or more server identifiers comprises a server group identifier and a server hardware identifier. In some embodiments, the one or more heuristics is based on existence of a standard value for the one or more configuration values. In some embodiments, the one or more heuristics is based on existence of a common value for the one or more configuration values, and wherein the common value is present in at least a configurable threshold number of servers in the plurality of hosted servers. In some embodiments, the notification of one or more server configuration issues comprises a message-based communication to one or more development engineers. In some embodiments, the notification of one or more server configuration issues is provided to an automated configuration remediation system.

Figure 5:
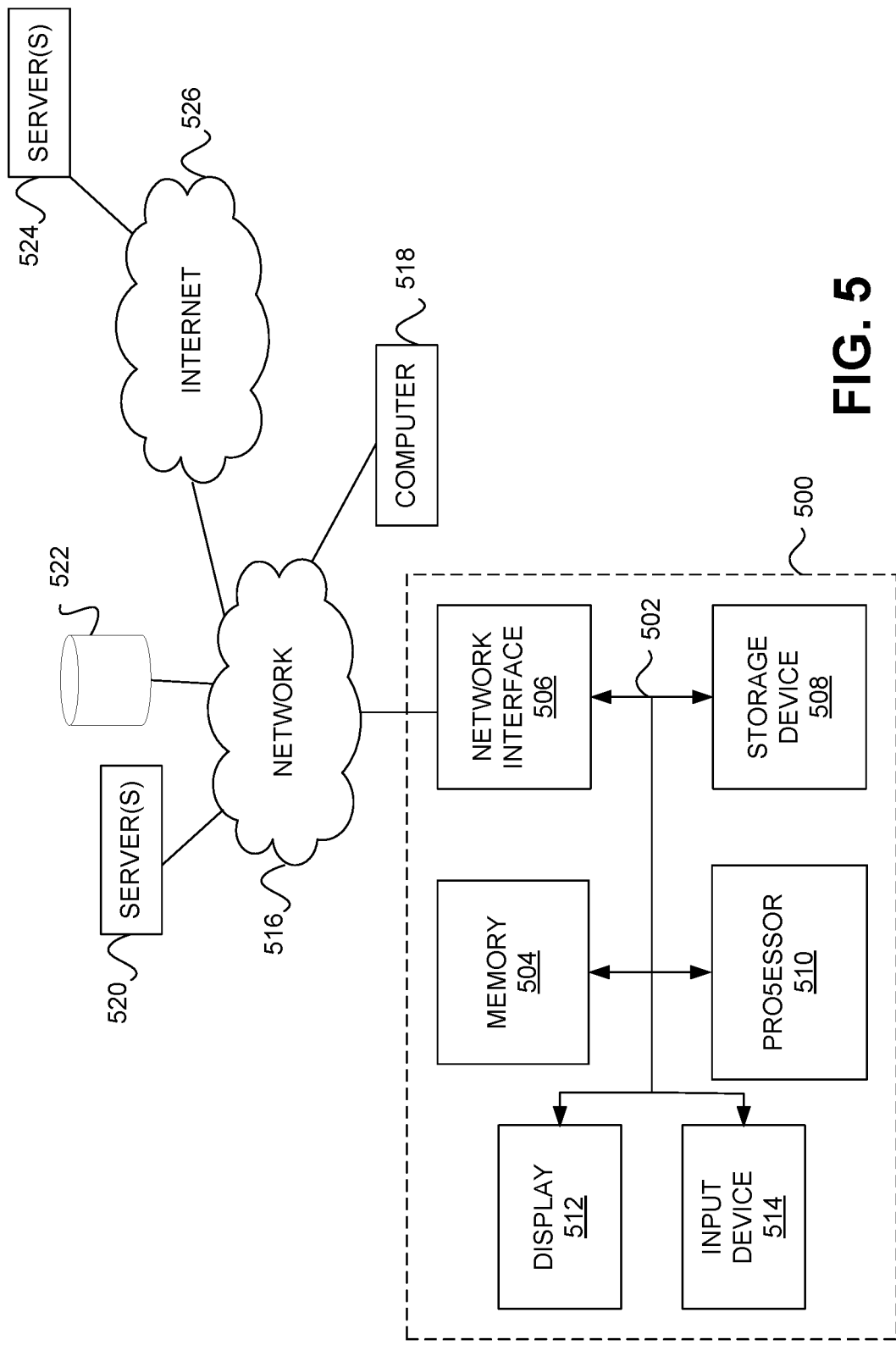
FIG. 5 is a diagram illustrating a sample computing device architecture for implementing various aspects described herein.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

EXAMPLES

Example 1

If there are 10 hosts in the Job Group, the values of jvmXmx may be as shown in connection with the following table. In this example, the standard value for jvmXmx is 30720 m.

TABLE 1

| Host | group | jvmXmx |
|---|---|---|
| job01 | Job | 30720 m |
| job02 | Job | 30720 m |
| job03 | Job | 30720 m |
| job04 | Job | 30720 m |
| job05 | Job | 30720 m |
| job06 | Job | 20480 m |
| job07 | Job | 30720 m |
| job08 | Job | 20480 m |

TABLE 1-continued

| Host | group | jvmXmx |
|---|---|---|
| job09 | Job | 30720 m |
| job10 | Job | 30720 m |

In this example, a majority of hosts have the standard jvmXmx value, while job06 and job08 have no standard value. The analysis system assumes there is a configuration error of jvmXmx in host job06/job08 and will send an alert email to development engineers to do a deep investigation and fix it.

Example 2

If there are 10 hosts in the API Group, the values of releaseVersion are as following table. The is no standard value for releaseVersion.

TABLE 2

| Host | Group | releaseVersion |
|---|---|---|
| api01 | API | b2111.20220309143405 |
| api02 | API | b2111.20220309143405 |
| api03 | API | b2111.20220309143405 |
| api04 | API | b2111.20220309143405 |
| api05 | API | b2111.20220309143405 |
| api06 | API | b2111.20220309143405 |
| api07 | API | b2111.20220309143405 |
| api08 | API | b2111.20220309143405 |
| api09 | API | b2111.20220309013317 |
| api10 | API | b2111.20220309013317 |

In this example, half of the number of hosts have the same releaseVersion value b2111.20220309143405. The analysis system will regard it as a common value. Two exceptions are the api09 and api10 which have different values. The analysis system assumes there is a configuration error of releaseVersion in host api09/api10 and will send an alert email to development engineers to do a deep investigation and fix it.

Example 3

If there are 10 hosts in the UI Group, the values of releaseVersion are as following table. The is no standard value for releaseVersion.

TABLE 3

| Host | group | releaseVersion |
|---|---|---|
| ui01 | UI | b2111.20220401236827 |
| ui02 | UI | b2111.20220401236827 |
| ui03 | UI | b2111.20220402452631 |
| ui04 | UI | b2111.20220402452631 |
| ui05 | UI | b2111.20220401143405 |
| ui06 | UI | b2111.20220401143405 |
| ui07 | UI | b2111.20220401143405 |
| ui08 | UI | b2111.20220402519273 |
| ui09 | UI | b2111.20220402519273 |
| ui10 | UI | b2111.20220402519273 |

Here, there are no common values that belong to the half number of hosts. The analysis system assumes there is a configuration error of releaseVersion in all hosts and will send an alert email to development engineers to do a deep investigation and fix it.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

1. One or more non-transitory computer-readable media storing computer-executable instructions that, when executed by a processor, perform a method for applying one or more heuristics to collected server configurations to detect anomalous server configurations, the method comprising:
   requesting, by a collection system, server configuration data, including one or more server configuration values, from a plurality of configuration agents running on a plurality of hosted servers to detect anomalous server configurations,
   wherein the plurality of hosted servers is grouped into a plurality of groups, each group of the plurality of groups identified by one or more server identifiers and comprising hosted servers using a same or a related server configuration;
   receiving, at the collection system, from the plurality of configuration agents the one or more server configuration values of each hosted server in the plurality of hosted servers;
   storing the one or more server configuration values in one or more databases, organized based on the one or more server identifiers;
   accessing, by an analysis system, the one or more server configuration values from the one or more databases;
   applying one or more heuristics to the one or more server configuration values of the hosted servers in each group of the plurality of groups based on the one or more server identifiers; and
   in response to detecting the presence of one or more anomalous server configurations in the plurality of groups, providing a notification of one or more server configuration issues.

2. The non-transitory computer-readable media of claim 1, wherein the configuration values comprise:
   operating system configuration values and application configuration values.

3. The non-transitory computer-readable media of claim 1, wherein the one or more server identifiers comprises a server group identifier and a server hardware identifier.

4. The non-transitory computer-readable media of claim 1, wherein the one or more heuristics is based on existence of a standard value for the one or more configuration values.

5. The non-transitory computer-readable media of claim 1, wherein the one or more heuristics is based on existence of a common value for the one or more server configuration values, the common value corresponding to a count of the one or more server configuration values appearing in the server configuration data of the plurality of hosted servers using the same or the related server configuration in each group of the plurality of groups, and wherein the common value is present in at least a configurable threshold number of servers in the plurality of hosted servers.

6. The non-transitory computer-readable media of claim 1, wherein the notification of one or more server configuration issues is provided to an automated configuration remediation system.

7. A method for applying one or more heuristics to collected server configurations to detect anomalous server configurations, the method comprising:
   requesting, by a collection system, server configuration data, including one or more server configuration values, from a plurality of configuration agents running on a plurality of hosted servers to detect anomalous server configurations,
   wherein the plurality of hosted servers is grouped into a plurality of groups, each group of the plurality of groups identified by one or more server identifiers and comprising hosted servers using a same or a related server configuration;
   receiving, at the collection system, from the plurality of configuration agents the one or more server configuration values of each hosted server in the plurality of hosted servers;
   storing the one or more server configuration values in one or more databases, organized based on the one or more server identifiers;
   accessing, by an analysis system, the one or more server configuration values from the one or more databases;
   applying one or more heuristics to the one or more server configuration values of the hosted servers in each group of the plurality of groups based on the one or more server identifiers; and
   in response to detecting the presence of one or more anomalous server configurations in the plurality of groups, providing a notification of one or more server configuration issues.

8. The method of claim 7, wherein the one or more server identifiers comprises a server group identifier and a server hardware identifier.

9. The method of claim 7, wherein the one or more heuristics is based on existence of a standard value for the one or more configuration values.

10. The method of claim 7, wherein the one or more heuristics is based on existence of a common value for the one or more server configuration values, the common value corresponding to a count of the one or more server configuration values appearing in the server configuration data of the plurality of hosted servers using the same or related server configuration in each group of the plurality of groups, and wherein the common value is present in at least a configurable threshold number of servers in the plurality of hosted servers.

11. The method of claim 8, wherein the notification of one or more server configuration issues comprises a message-based communication to one or more development engineers.

12. The method of claim 7, wherein the notification of one or more server configuration issues is provided to an automated configuration remediation system.

13. A system for applying one or more heuristics to collected server configurations to detect anomalous server configurations, the system comprising:
   at least one processor;
   and at least one non-transitory memory storing computer executable instructions that when executed by the at least one processor cause the system to carry out actions comprising:
      requesting, by a collection system, server configuration data, including one or more server configuration values, from a plurality of configuration agents running on a plurality of hosted servers to detect anomalous server configurations,
      wherein the plurality of hosted servers is grouped into a plurality of groups, each group of the plurality of groups identified by one or more server identifiers and comprising hosted servers using a same or a related server configuration;
      receiving, at the collection system, from the plurality of configuration agents the one or more configuration values of each hosted server in the plurality of hosted servers;
      storing the one or more server configuration values in one or more databases, organized based on the one or more server identifiers;
      accessing, by an analysis system, the one or more server configuration values from the one or more databases;
      applying one or more heuristics to the one or more server configuration values of the hosted servers in each group of the plurality of groups based on the one or more server identifiers; and
      in response to detecting the presence of one or more anomalous server configurations in the plurality of groups, providing a notification of one or more server configuration issues.

14. The system of claim 13, wherein the configuration values comprise:
   operating system configuration values and application configuration values.

15. The system of claim 13, wherein the one or more server identifiers comprises a server group identifier and a server hardware identifier.

16. The system of claim 13, wherein the one or more heuristics is based on existence of a standard value for the one or more configuration values.

17. The system of claim 13, wherein the one or more heuristics is based on existence of a common value for the one or more server configuration values, the common value corresponding to a count of the one or more server configuration values appearing in the server configuration data of the plurality of hosted servers using the same or the related server configuration in each group of the plurality of groups, and wherein the common value is present in at least a configurable threshold number of servers in the plurality of hosted servers.

18. The system of claim 13, wherein the notification of one or more server configuration issues comprises a message-based communication to one or more development engineers.

19. The non-transitory computer-readable media of claim 1, wherein applying one or more heuristics further comprises, for each group of the plurality of groups:
   determining if a standard value should be used to detect an anomalous server configuration within the group based on the one or more server identifiers;
   in response to determining the standard value should not be used, determining if a common value should be used to detect the anomalous server configuration within the group; and
   in response to determining that none of the standard value and the common value should be used, concluding the anomalous server configuration is detected within the group.

20. The non-transitory computer-readable media of claim 5, wherein the configurable threshold number of servers is a majority of servers in the plurality of hosted servers.

* * * * *